United States Patent Office.

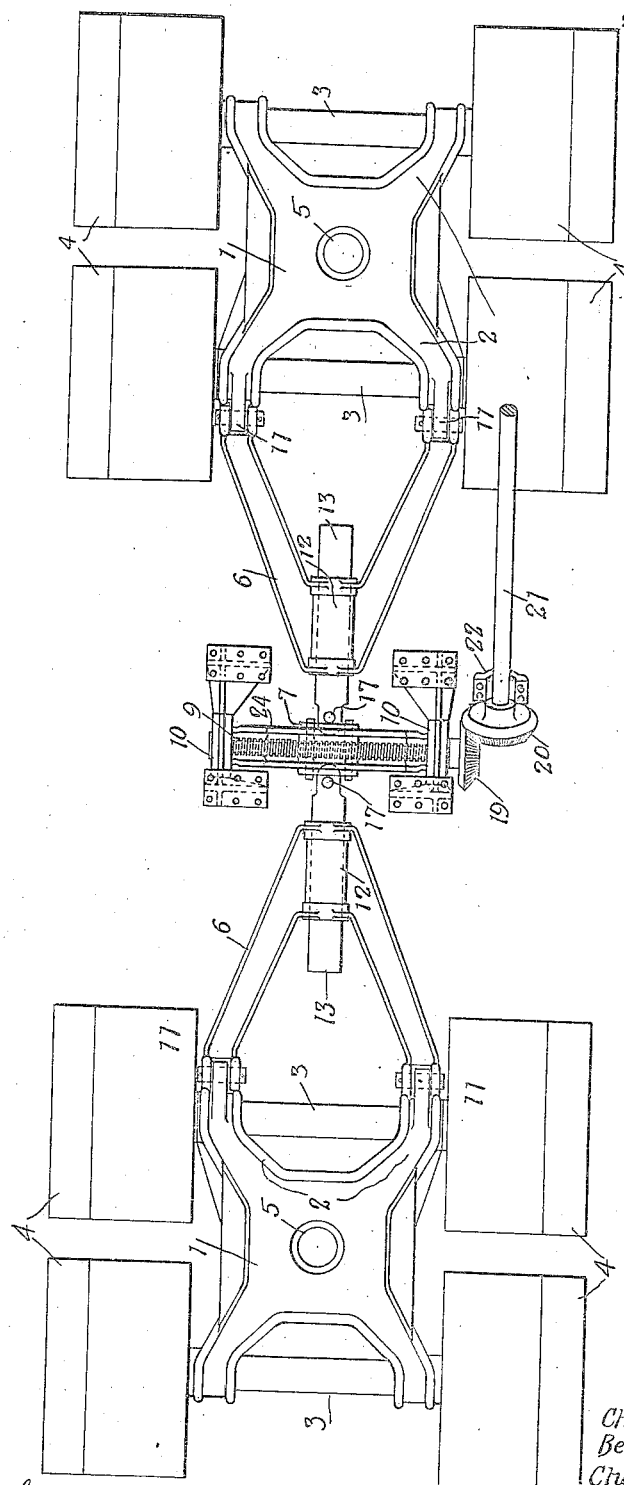

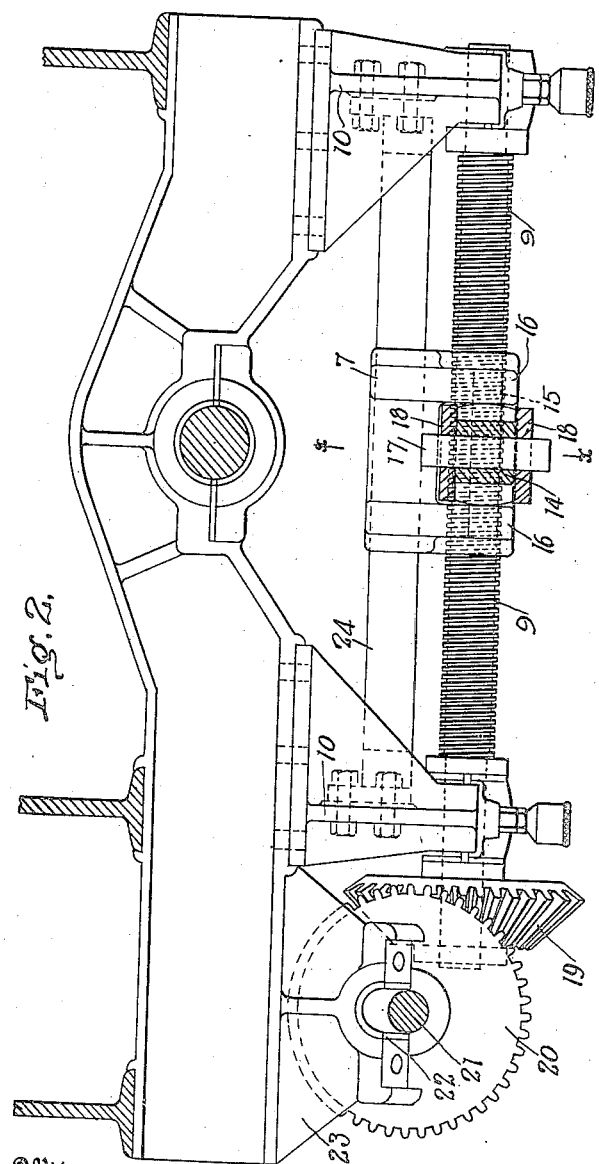
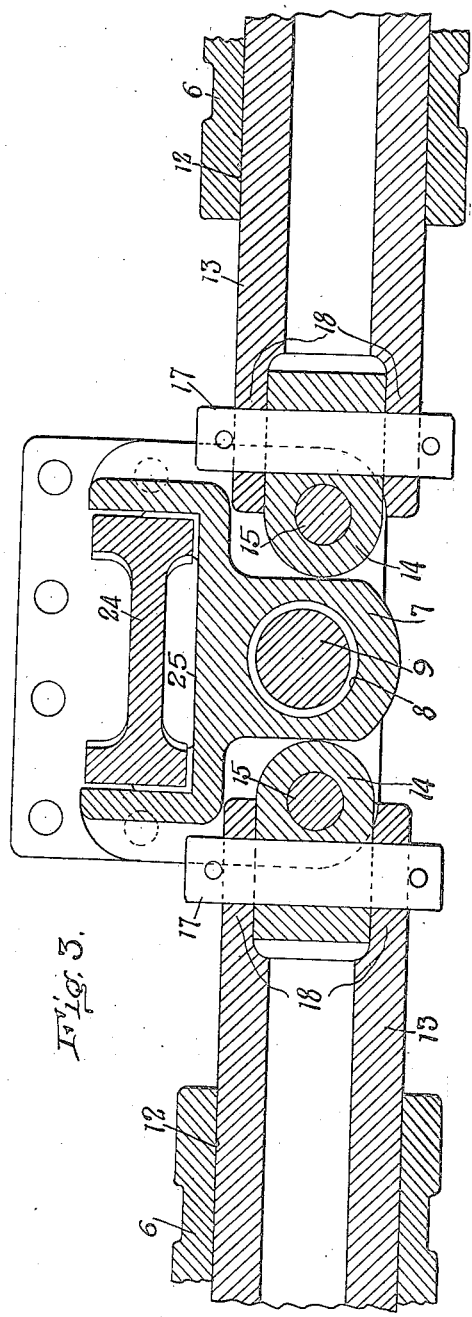

CHARLES B. KING, BENJAMIN JACOBY, AND CHARLES S. JOHNSON, OF MARION, OHIO, ASSIGNORS TO THE MARION STEAM SHOVEL COMPANY, OF MARION, OHIO, A CORPORATION OF OHIO.

STEERING MECHANISM.

1,126,229.     Specification of Letters Patent.     Patented Jan. 26, 1915.

Application filed November 10, 1913. Serial No. 800,072.

*To all whom it may concern:*

Be it known that we, CHARLES B. KING, BENJAMIN JACOBY, and CHARLES S. JOHNSON, citizens of the United States, residing at Marion, in the county of Marion, and State of Ohio, have invented certain new and useful Improvements in Steering Mechanism, of which the following is a specification, reference being had therein to the accompanying drawing.

This invention relates to steering mechanism and is designed more particularly for steam shovels or other excavating devices which are self propelled. It has been customary to provide such shovels with a single steering truck and to actuate this steering truck by power through means of a screw directly connected with the truck. In larger sizes of machines, however, it is desirable to steer both trucks and further the power required to move the steering trucks is very great owing to the weight of the machine and the condition of the surface over which it is traveling.

The object of the present invention is to provide mechanism for actuating both trucks to simultaneously impart steering movement thereto; to provide mechanism which will impart a powerful turning thrust upon the truck or trucks; and further, to provide such a mechanism which will be simple and strong in its construction, positive in its action, and which will be so constructed and arranged that there will be no liability of its binding or becoming locked against movement.

In the accompanying drawings, Figure 1 is a plan view of the two steering trucks of a steam shovel showing our invention applied thereto; Fig. 2 is a transverse, sectional view of the frame of such a shovel showing our invention in elevation; and Fig. 3 is a sectional view taken on the line $x$ $x$ of Fig. 2.

In these drawings we have illustrated one embodiment of our invention and have shown the same as applied to a double truck steam shovel in which both trucks are pivotally mounted and constitute steering trucks. It will be understood, however, that the invention is applicable to machines of various kinds and that the term "steering truck" as herein employed is not to be limited to the particular truck shown in the drawings but is intended to include any supporting structure for a wheel which structure is capable of steering movement, and further, while it is one of the objects of the invention to provide a steering device which will impart steering movement to both trucks, and the invention has been so shown in the drawings, it will be understood that many features of the invention and the principal parts of the mechanism are applicable to a single truck as completely and as readily as to the two steering trucks.

In these drawings we have illustrated the trucks as comprising truck frames, 1, each of which has a series of arms 2, which arms are arranged in pairs to support axles 3 on which are mounted traction wheels 4. Each truck is connected with the main frame of the machine by means of a vertical pin or king bolt 5 which permits steering movement to be imparted thereto. We have not shown the connection between the trucks and the frames, other than to show the pin itself, because this connection, as well as the frame and the parts carried thereby form no part of the present invention and may be of any suitable or well known construction. In order that the power employed for steering purposes may be utilized to the best possible advantage we prefer to transmit this power to the steering trucks through levers, and, to this end, we have provided each truck with inwardly extending arms or levers 6. As here shown the arms or levers are in the form of V-shaped yokes having the arms thereof connected with the respective trucks and converging inwardly, that is, the arms forming the yoke of the forward truck converge rearwardly and the arms forming the yoke for the rear truck converge forwardly.

An actuating device is supported near the inner ends of the yokes or arms and is adapted to impart transverse movement to the inner ends of both yokes simultaneously and in the same direction. This actuating device may be of any suitable construction but in the present instance we have shown it in the form of a cross head 7 having a screw-threaded aperture 8 extending transversely to the direction of travel of the machine. Mounted in the screw-threaded aperture of the cross head is a screw shaft 9 journaled at its opposite ends in bearing brackets 10, which brackets are supported from suitable parts of the main frame, or in any other suitable manner. The steering arms or yokes of the two trucks may be connected with the cross head in any suitable manner but the connection must be such as to permit it to accommodate itself to the movement of the cross head and to the vertical movement of the trucks as they travel over an uneven supporting surface. To this end we have pivotally connected the two arms of each yoke to the respective truck frames, as shown at 11, and have slidably connected these yokes with the cross head so that the connection will be lengthened or shortened as the cross head travels back and forth. To this end the two parts or arms forming each yoke are rigidly connected at their inner ends and are provided with a longitudinal opening or guideway 12 in which is slidably mounted a connecting rod 13, the inner end of which is connected with the cross head 7, this connection preferably being such as to permit of movement both about a horizontal axis and a vertical axis. To accomplish this a pivot block 14 is mounted on a horizontal pin 15 carried by lugs 16 formed on the side of the cross head and each bearing block has a part provided with a vertical aperture to receive a vertical pivot pin 17 which extends through lugs 18 on the connecting rod 13. Thus, the connecting device has ample movement about horizontal axes to enable it to accommodate itself to the varying relative positions of the truck and the cross head as the former is displaced vertically during its travel; and further, the connection will adjust itself both in position and in length to the travel of the cross head along the screw-shaft 9. Rotary movement may be imparted to the screw-shaft 9 in any suitable manner and, in the present instance, we have shown it as provided on one end with a bevel gear 19 meshing with a corresponding gear 20 on a shaft 21 which is journaled in a bearing 22 carried by a bracket 23 suspended from the frame of the machine and which shaft is connected with a suitable source of power. This source of power may, if desired, be a separate steering engine or the power may be derived either directly or indirectly from any of the engines or prime movers included in the shovel mechanism. Inasmuch as the source of power for actuating the steering mechanism does not form a part of the invention it has not been thought necessary to illustrate and describe the same.

A fixed guide is preferably provided for the cross head 17 to maintain the same always in proper relation to the screw shaft, and thus prevent its binding thereon, and to receive the strain imposed upon the cross head and thus relieve the screw shaft of this strain and thereby preventing not only the binding of the cross head but permanent injury thereto due to abnormal strains imposed upon the steering mechanism. In the present form of the mechanism this guide comprises a guide bar 24 rigidly secured at its ends to the brackets 10 which support the screw shaft and fit into a recess 25 formed in the upper portion of the cross head. The guide bar fits snugly within the recess of the cross head so as to receive all strain imposed thereon but the cross head is free to slide along the same. Thus, the guide bar does not interfere with the travel of the cross head but serves to cause it to travel in a straight line parallel with the screw shaft.

The operation of the mechanism will be readily understood from the description of the several parts thereof and it will be apparent that we have provided a steering mechanism which is highly efficient in its operation; which will simultaneously impart movement to the two trucks; which will exert a powerful thrust upon the steering truck, due to the lever connections between the actuating device and the truck; which is very simple in its construction and operation and which is effectually prevented from binding or becoming distorted in such a manner as to interfere with its operation.

It will be understood that while we have shown and described the mechanism as driven from an engine or other suitable source of power it is wholly capable of manual operation, particularly when used in connection with the smaller sizes of machines, whether these machines be excavating machines or machines of other types.

While we have shown and described one embodiment of our invention we wish it to be understood that this has been chosen for the purpose of illustration only and that we do not desire to be limited to the details of construction shown and described, for obvious modifications will occur to a person skilled in the art.

Having thus fully described our invention, what we claim as new and desire to secure by Letters Patent, is:—

1. The combination with a steering truck, having an inwardly extending arm, of a screw shaft extending transversely to said arm, a cross head mounted on said shaft and operatively connected with said arm and means to hold said cross head against lateral displacement and relieve said shaft from transverse strains.

2. The combination with steering trucks, having inwardly extending arms, a screw shaft extending transversely to said arms near the inner ends thereof, a cross head mounted on said shaft and operatively connected with said arms and a guide to hold said cross head against lateral displacement and prevent the same from exerting a lateral strain upon said screw shaft.

3. The combination, with a steering truck having an inwardly extending arm, of an actuating device, means to impart transverse movement to said actuating device, and a universal pivotal connection between said actuating device and said arm.

4. The combination with steering trucks having inwardly extending arms, of a screw shaft extending transversely to said arms, a cross head mounted on said shaft for movement lengthwise thereof, said arms being connected with said cross head for movement about both the transverse and horizontal axes, a guide to hold said cross head against lateral displacement and prevent the same from exerting transverse strains on said screw shaft.

5. The combination with a steering truck having an inwardly projecting arm provided with a slideway, of an actuating member, means for moving said actuating member transversely to said slideway, and a connecting rod connected with said actuating member for movement about both horizontal and transverse axes relatively thereto, and mounted in said slideway.

6. The combination with a steering truck having an inwardly projecting arm provided with a slideway, of a screw shaft extending transversely to said slideway, a cross head mounted on said shaft, adapted to be moved by the rotation thereof, a connecting rod having one end pivotally connected with said cross head for movement about both a vertical axis and a horizontal axis relatively thereto, and mounted in said slideway.

7. The combination with a steering truck having an inwardly projecting arm provided with a slideway, of a screw shaft extending transversely to said slideway, a cross head mounted on said shaft and adapted to be moved by the rotation thereof, a connecting rod having one end connected with said cross head for movement about both a vertical axis and a horizontal axis relatively thereto, and mounted in said slideway, and a fixed guide to cause said cross head to move in a line substantially parallel with the axis of said screw shaft and prevent lateral or twisting strains on said screw shaft.

8. The combination with a steering truck having an inwardly projecting arm provided with a slideway, of a screw shaft extending transversely to said slideway, a crosshead mounted on said shaft and adapted to be moved by the rotation thereof, a connecting rod having one end connected with said cross head for movement about both a vertical axis and a horizontal axis relative thereto, and mounted in said slideway, and a guide bar coöperating with said cross head to cause it to move in a line substantially parallel with the axis of said screw shaft and prevent lateral of twisting strains on said shaft, one of said parts being recessed to receive the other of said parts.

9. The combination, with a steering truck, a yoke pivotally connected with said truck and having a slideway extending in the line of movement of said truck, of a screw shaft, a cross head having a screw-threaded aperture to receive said shaft, a connecting member pivotally connected with said cross head on a vertical axis and slidably mounted in said slideway, and a guide bar rigidly mounted adjacent to and parallel with said screw shaft, said cross head having a recess to receive said guide bar.

10. In a machine of the character described, the combination, with a frame, a pair of steering trucks connected with said frame, inwardly extending arms connected with the respective trucks and each having a guideway arranged in the line of movement of said trucks, a screw shaft rotatably mounted on said frame, a cross head mounted on said shaft, connecting members connected with said cross head and slidably mounted in said guideways, said cross head having a recess in the upper portion thereof, and a guide bar rigidly secured to said frame and extending into said recess.

11. In a machine of the character described, the combination with a frame, a pair of steering trucks connected with said frame, inwardly extending arms connected with the respective trucks and each having a guideway arranged in the line of movement of said trucks, a screw shaft rotatably mounted on said frames, a cross head on said shaft, connecting members connected with said cross head for movement about both a horizontal axis and a vertical axis relatively thereto and said connecting members being slidably mounted in said guideways, said cross head having a recess in the upper portion thereof, and a guide bar rigidly secured to said frame and extending in said recess.

12. The combination, with a steering truck, a yoke pivotally connected to said truck on a horizontal axis and having a longitudinal guideway, a screw shaft, a cross head mounted on said screw shaft, and a connecting member connected to said cross head on both a horizontal and a vertical axis and slidably mounted in said guideway.

In testimony whereof, we affix our signatures in presence of two witnesses.

CHARLES B. KING.
BENJAMIN JACOBY.
CHARLES S. JOHNSON.

Witnesses:
FRANCIS BANELL JENNINGS,
HERBERT E. ROUSH.